US011302943B2

(12) United States Patent
Baron et al.

(10) Patent No.: US 11,302,943 B2
(45) Date of Patent: Apr. 12, 2022

(54) FUEL CELL COMPRISING A PRESSURE REGULATING DEVICE AND METHOD FOR REGULATING PRESSURE

(71) Applicant: SAFRAN POWER UNITS, Toulouse (FR)

(72) Inventors: Matthieu Baron, Moissy-Cramayel (FR); Mathieu Baudy, Moissy-Cramayel (FR); Théophile Horde, Moissy-Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 95 days.

(21) Appl. No.: 16/765,455

(22) PCT Filed: Nov. 28, 2018

(86) PCT No.: PCT/EP2018/082838
§ 371 (c)(1),
(2) Date: May 19, 2020

(87) PCT Pub. No.: WO2019/106010
PCT Pub. Date: Jun. 6, 2019

(65) Prior Publication Data
US 2020/0313211 A1  Oct. 1, 2020

(30) Foreign Application Priority Data
Nov. 28, 2017  (FR) ...................................... 1761269

(51) Int. Cl.
*H01M 8/04746*  (2016.01)
*H01M 8/04089*  (2016.01)
(Continued)

(52) U.S. Cl.
CPC .... *H01M 8/04761* (2013.01); *H01M 8/04097* (2013.01); *H01M 8/04402* (2013.01); *H01M 2008/1095* (2013.01); *H01M 2250/20* (2013.01)

(58) Field of Classification Search
CPC .......... H01M 8/04402; H01M 8/0441; H01M 8/04761; H01M 8/04097; H01M 8/04089;
(Continued)

(56) References Cited

U.S. PATENT DOCUMENTS

2007/0077472 A1\* 4/2007 Uehara ............. H01M 8/04425
429/415
2007/0205384 A1\* 9/2007 Kurosawa ............. F15B 13/086
251/127
2009/0214900 A1\* 8/2009 Hoffjann ........... H01M 8/04156
429/413

FOREIGN PATENT DOCUMENTS

WO  WO 2011/089502 A1  7/2011

OTHER PUBLICATIONS

Search Report from French Intellectual Property Office on corresponding FR application (FR1761269) dated Jun. 6, 2018.
(Continued)

*Primary Examiner* — Matthew W Van Oudenaren
(74) *Attorney, Agent, or Firm* — Klein, O'Neill & Singh, LLP

(57) ABSTRACT

A fuel cell, in particular for an aeronautical application, comprising a central module comprising a plurality of cells for generating electricity, a first end plate and a second end plate, at least one of the end plates comprising at least one outlet pipe. The fuel cell comprises a pressure-regulating device fluidly connected to the outlet pipe, the pressure-regulating device comprising at least one arm fluidly connected to the outlet pipe, at least one member for opening/closing the arm, at least one member for measuring the
(Continued)

pressure in the outlet pipe and at least one member for controlling the opening/closing member according to the measured pressure.

9 Claims, 4 Drawing Sheets

(51) Int. Cl.
    *H01M 8/0438*     (2016.01)
    *H01M 8/10*     (2016.01)

(58) Field of Classification Search
    CPC ............ H01M 8/2483; H01M 8/0258; H01M 8/2465; H01M 8/2484; H01M 8/2415; H01M 8/2485; H01M 2008/1095; H01M 2250/20
    See application file for complete search history.

(56) References Cited

OTHER PUBLICATIONS

International Search Report and Written Opinion on corresponding PCT application (PCT/EP2018/082838) from International Searching Authority (EPO) dated Jan. 24, 2019.

\* cited by examiner

FUEL CELL COMPRISING A PRESSURE REGULATING DEVICE AND METHOD FOR REGULATING PRESSURE

TECHNICAL FIELD

The present invention relates to the field of fuel cells for an aeronautical application and, more particularly, the regulation of pressure in such a fuel cell.

In a known manner, a fuel cell makes it possible to produce electrical energy from hydrogen and air (fuels). With reference to FIG. 1, a fuel cell P comprises a central module 1, comprising a plurality of cells, placed between two end plates 2A, 2B which make it possible, on the one hand, to maintain the cells together and, on the other hand, to enable an introduction of the fuels and a discharge of the reaction products, constituted mainly of water and traces of fuel. In this example, the first plate 2A comprises a first inlet pipe 21 for a first fuel C1, here dioxygen O2, and a second inlet pipe 21' for the second fuel C2, here dihydrogen H2. The second plate 2B comprises a first outlet pipe 22 through which are discharged water and traces of dioxygen R(C1) and a second outlet pipe 22' through which are discharged water and traces of dihydrogen R(C2).

As an example, in the case of a fuel cell of High Temperature Proton Exchange Membrane Fuel Cell (HT-PEMFC) type, the operating temperatures may reach 200° C. At such temperatures, the reaction products circulating in the outlet pipes 22, 22' are in the gaseous state and may be discharged in an optimal manner. In rare operating conditions, the operating temperature can drop and the fluids circulating in the outlet pipes 22, 22' may condensate in the liquid state. If the condensates are too numerous, the outlet pipes 22, 22' are liable to be obstructed, which can lead to exhaust problems, and consequently a considerable rise in pressure in the outlet pipes 22, 22', which could damage the fuel cell P.

For an aeronautical application, when a fuel cell P is on board an aircraft, it is subjected to different temperatures and pressures. As an example, when the altitude of the aircraft is high, for example 17,000 m, the external temperature is low, for example of the order of −56.5° C., and the external pressure is low, for example of the order of 9000 Pa. Such an external pressure influences the operation and the performances of the fuel cell P, in particular, the pressure of the fluid in the outlet pipes 22, 22' of the second end plate 2B when they are directly in contact with the external environment. Such operating conditions increase the risk of condensation of reaction products and, consequently, the risk of malfunction.

The aim of the invention is thus to overcome these drawbacks by proposing a fuel cell making it possible to regulate the pressure in its outlet pipes and to do so independently of the environment in which the fuel cell is used.

SUMMARY

To this end, the invention relates to a fuel cell, in particular for an aeronautical application, comprising:

a central module comprising a plurality of cells for generating electricity from at least a first fuel and a second fuel, a first end plate, connected to a first end of the central module and a second end plate, connected to a second end of the central module and at least one of the end plates comprising at least one outlet pipe fluidically connected to the central module and suited to discharging at least one reaction product.

The invention is remarkable in that it comprises a pressure regulating device fluidly connected to the outlet pipe, said pressure regulating device comprising:

at least one branch of determined passage section, the branch being fluidly connected to the outlet pipe, at least one member for opening/closing the branch, at least one member for measuring the pressure in the outlet pipe and at least one member for controlling the opening/closing member as a function of the measured pressure.

The use of a regulating device associated with an outlet pipe makes it possible to regulate the pressure in the fuel cell and facilitates the discharge of condensates from the outlet pipe. Any malfunction is thus avoided. Advantageously, the regulating device makes it possible to modify the passage section dynamically as a function of the measured pressure. In other words, even if the internal pressure of the fuel cell evolves in an important manner under the effect of the external conditions (temperature, pressure), the internal pressure remains regulated, which ensures optimal and secure operation.

Preferably, the pressure regulating device comprises a plurality of branches fluidically connected to the outlet pipe, each branch having a determined passage section, each branch being associated with at least one opening/closing member of the branch, the controlling member being configured to control the opening/closing members as a function of the measured pressure.

The use of several branches makes it possible to modify the overall passage section as a function of the opening/closing of each branch. In other words, the overall section is modified in predetermined stages. Such a modification is more robust and may be implemented in a practical and simple manner over a wide pressure and temperature range.

In a preferred manner, the determined passage sections of the branches are different from each other. Thus, it is possible to define a large number of different overall sections to form a large number of stages. The evolution of the overall section is thus progressive.

According to a preferred aspect, the pressure regulating device comprises at least one first branch having a first determined passage section fluidly connected to the outlet pipe, the first branch being associated with a first opening/closing member and at least one second branch having a second determined passage section fluidly connected to the outlet pipe, the second branch being associated with a second opening/closing member, the controlling member being configured to control the first opening/closing member and the second opening/closing member as a function of the measured pressure. Preferably, the second passage section is greater than the first passage section.

According to an aspect of the invention, the pressure regulating device comprises at least one third branch having a third determined passage section fluidly connected to the outlet pipe, the third branch being associated with a third opening/closing member. Preferably, the third passage section is larger than the second passage section.

In a preferred manner, the regulating device extending from upstream to downstream from the outlet pipe, the opening/closing member is situated near to a downstream end of said regulating device. The opening/closing member is advantageously remote from the outlet pipe, which makes it possible to avoid the opening/closing member being affected by the temperature, generally high, of the outlet pipe. The reliability of said opening member is improved.

Preferably, the opening/closing member is configured to evolve between only two states: an open state and a closed state. Such an opening/closing member opposes a proportional opening/closing member of which the performances are not optimal over an extended temperature and pressure range.

Preferably, the pressure regulating device is fluidically connected to an outlet pipe wherein dihydrogen reaction products circulate. An outlet pipe wherein dihydrogen reaction products circulate generally speaking has a smaller section than an outlet pipe wherein dioxygen reaction products circulate. Also, it is simpler and more practical to regulate the pressure via the outlet pipe associated with dihydrogen.

According to a preferred aspect, the pressure regulating device is integrated in the end plate. This advantageously enables the end plate to fulfil several synergic functions (mechanical strength of the central module, introduction of fuels, discharge of the reaction products and regulation of the pressure). Such an embodiment makes it possible to limit the bulk of the fuel cell. The integration of the regulating device in an end plate, that is to say, in a hot environment, furthermore makes it possible to limit the risk of condensation.

Preferably, the end plate comprising a parallelepiped body, the pressure regulating device is integrated, at least partially, in the volume of said parallelepiped body. Thus, advantage is taken of the unused volume of the end plate to integrate the regulating device. According to this embodiment, the overall bulk of the end plate is advantageously not affected by the integration of the regulating device. In a preferred manner, the branch(es) of the regulating device are produced by additive manufacturing.

The invention also relates to a method for using a fuel cell such as described previously, the method comprising a step of measuring the pressure in the outlet pipe and, if the measured pressure is greater than a determined upper threshold, a step of opening at least one opening/closing member in such a way as to increase the overall passage section of the pressure regulating device. Thanks to the method, any over-pressure is avoided by controlled increase of the passage section of the regulating device.

The invention also relates to a method for using a fuel cell such as described previously, the method comprising a step of measuring the pressure in the outlet pipe and, if the measured pressure is below a determined lower threshold, a step of closing at least one opening/closing member in such a way as to decrease the overall passage section of the pressure regulating device. Thanks to the method, any under-pressure is avoided by controlled reduction of the passage section of the regulating device.

BRIEF DESCRIPTION OF THE DRAWINGS

The invention will be better understood on reading the description that follows, given only as an example, and by referring to the appended drawings in which.

It should be noted that the figures set out the invention in a detailed manner for implementing the invention, said figures obviously being able to better define the invention if need be.

DETAILED DESCRIPTION

Figure 1:
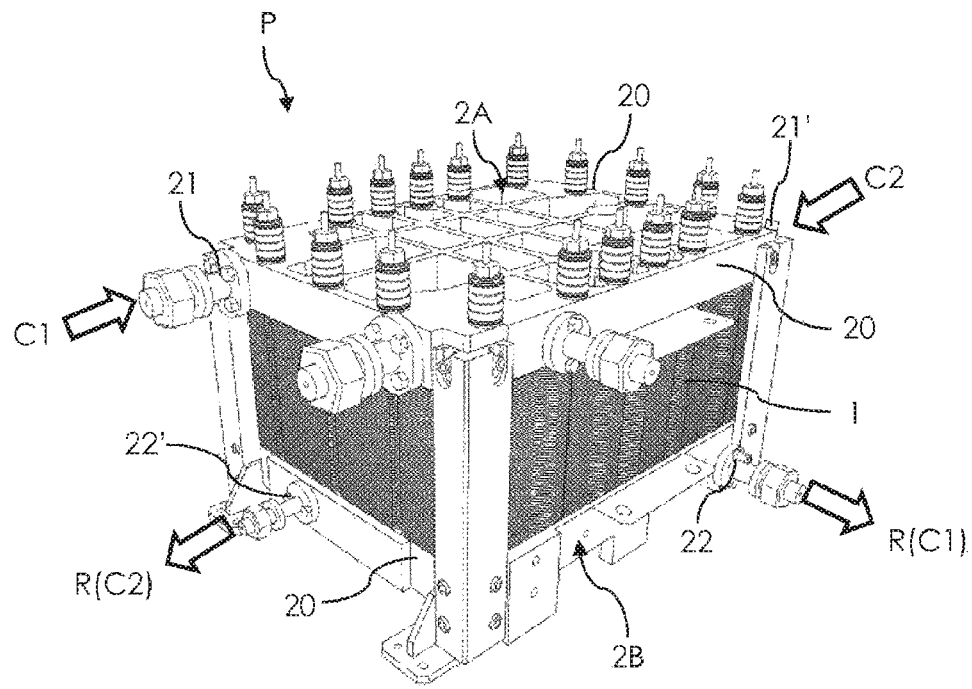
FIG. 1 is a schematic representation of a fuel cell with its end plates (already described)
Figure 2:
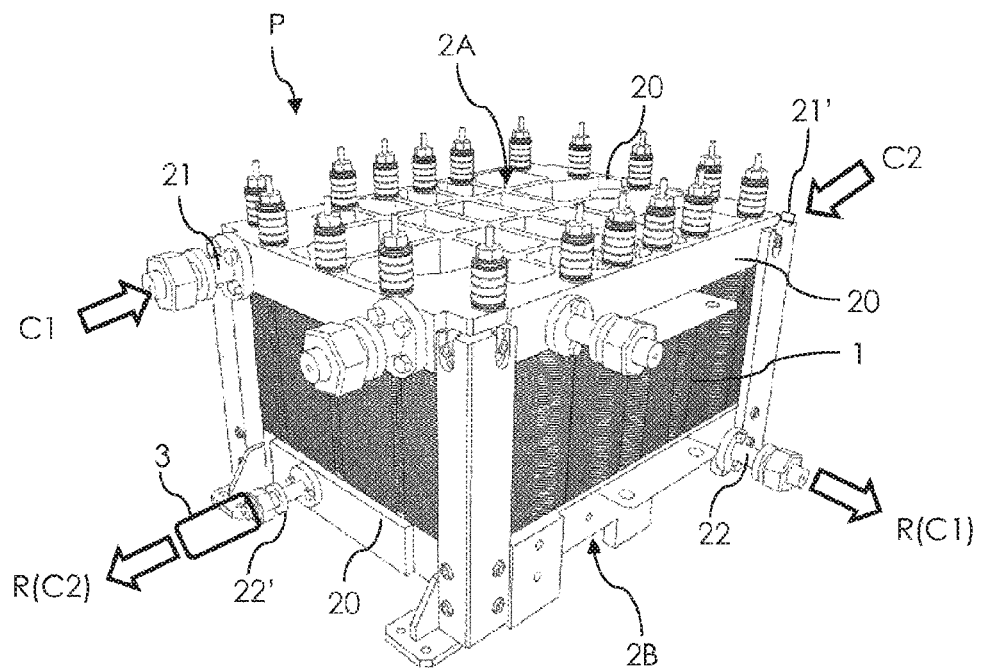
FIG. 2 is a schematic representation of a fuel cell according to the invention comprising a pressure regulating device.

With reference to FIG. 2, a fuel cell P comprising a central module 1 comprising a plurality of cells for generating electricity from fuels is represented in a schematic manner. In a known manner, the fuel cell P comprises a first end plate 2A (upper plate 2A), connected to a first end of the central module 1 and a second end plate 2B (lower plate 2B), connected to a second end of the central module 1.

With reference to FIG. 2, the first plate 2A comprises a first inlet pipe 21 for a first fuel C1, here dioxygen $O_2$, and a second inlet pipe 21' for the second fuel C2, here dihydrogen $H_2$. In an analogous manner, the second plate 2B comprises a first outlet pipe 22 for first reaction products R(C1), here water and traces of the first fuel C1, and a second outlet pipe 22' for second reaction products R(C2), here water and traces of the second fuel C2.

Such a fuel cell is known to those skilled in the art and will not be described in greater detail. It goes without saying that the number of inlet and outlet pipes could be different for each end plate 2A, 2B.

According to the invention, still with reference to FIG. 2, the fuel cell P comprises a pressure regulating device 3 connected to the second outlet pipe 22' of the second end plate 2B.

Figure 3:
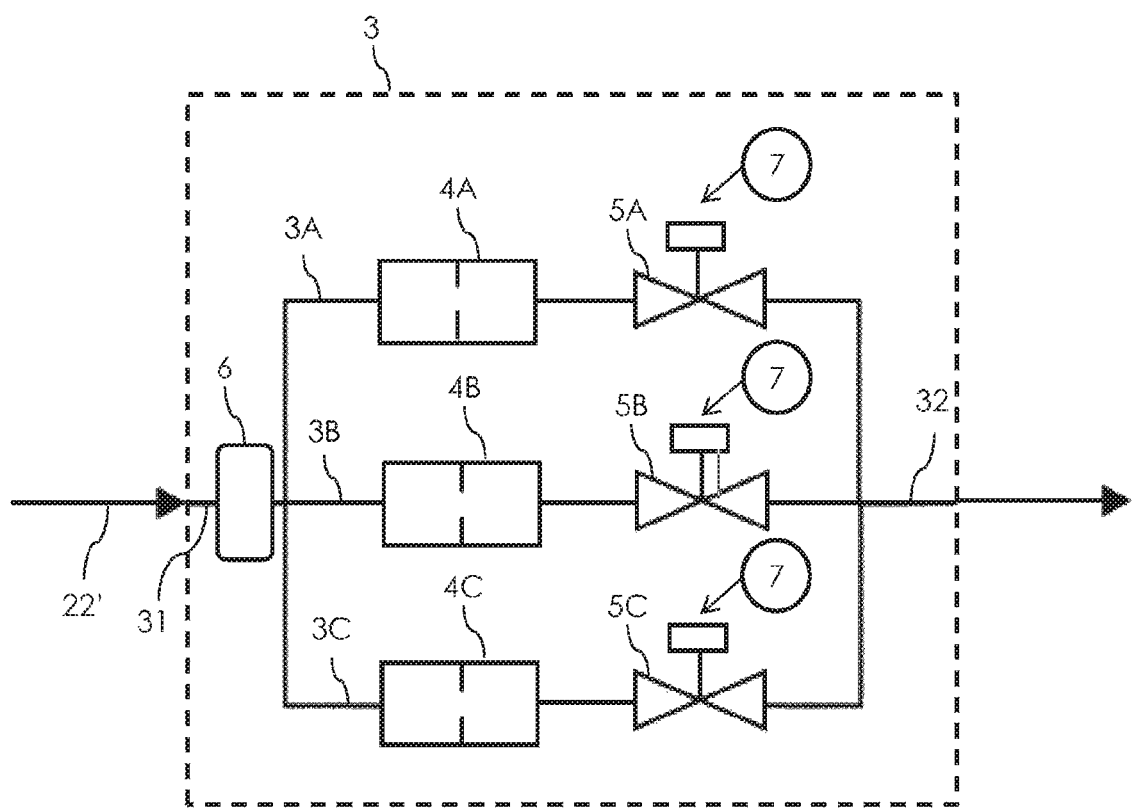
FIG. 3 is a schematic representation of a pressure regulating device.

In this example, with reference to FIG. 3, the pressure regulating device 3 comprises a plurality of branches 3A, 3B, 3C each having a determined passage section. Each branch 3A, 3B, 3C is associated with a member for opening/closing 5A, 5B, 5C the branch 3A, 3B, 3C. The regulating device 3 further comprises a member for measuring 6 the pressure P22 in the outlet pipe 22' and a member for controlling 7 the opening/closing member 5A, 5B, 5C as a function of the measured pressure P22 in such a way as to ensure a regulation of the pressure in the outlet pipe 22'. In other words, the regulating device 3 makes it possible to guarantee an optimal internal pressure independent of the external pressure. In this example, the pressure regulating device 3 is configured to maintain the pressure in the outlet pipe 22' within a determined range. In this example, in order to guarantee the mechanical integrity of the fuel cell P, the pressure P22 is maintained between 1 bar (1000 hPa) and 1.5 bars (1500 hPa).

With reference to FIG. 3, the pressure regulating device 3 comprises an inlet connector 31, fluidly connected to the outlet pipe 22, which is fluidically connected to three distinct branches 3A, 3B, 3C. Each branch 3A, 3B, 3C comprises a determined passage section 4A, 4B, 4C and is associated with an opening/closing member 5A, 5B, 5C configured to allow the circulation of fluid in said branch 3A, 3B, 3C.

The regulating device 3 comprises an outlet connector 32 fluidically connected to the branches 3A, 3B, 3C. The reaction products circulate from upstream to downstream from the inlet connector 31 to the outlet connector 32.

According to the invention, in this example, the determined passage sections 4A, 4B, 4C all have a different passage section. As an example, the determined passage sections 4A, 4B, 4C have respectively passage sections of 20 mm$^2$, 30 mm$^2$ and 40 mm$^2$. The smaller the passage section 4A, 4B, 4C, the greater the induced pressure drop. Thus, by opening/closing selectively one or more determined passage sections 4A, 4B, 4C, the overall pressure drop of the pressure regulating device 3 is controlled in a precise manner. The pressure P22 at the outlet of the outlet pipe 22' may thus be regulated in a precise and reliable manner in order to obtain a flow of the fluid which is sonic, that is to say, a flow of which the speed is greater than 1 Mach. Such a flow has a constant flow rate, which facilitates the determination of phenomena intervening in each passage section 4A, 4B, 4C.

In this exemplary embodiment, the determined passage sections 4A, 4B, 4C are in the form of washers which are pierced to a given calibre and mounted in the branches 3A, 3B, 3C. Such washers are reliable and have low wear. It goes without saying that the passage sections could be produced in a different manner, for example, formed directly with the branches 3A, 3B, 3C.

As indicated previously, one or more determined passage sections 4A, 4B, 4C may be opened simultaneously in order to modify the overall passage section. As an example, in the present case with three different passage sections 4A, 4B, 4C, it is possible to define six different overall passage sections to regulate the pressure.

In this example, the pressure regulating device 3 comprise three opening/closing members 5A, 5B, 5C configured to allow/block the circulation of fluid in the determined passage sections 4A, 4B, 4C. In particular, each opening/closing member 5A, 5B, 5C is configured to open or close the branch 3A, 3B, 3C wherein it is mounted.

Preferably, each opening/closing member 5A, 5B, 5C is positioned downstream of the calibrated orifice 4A, 4B, 4C with which it is associated, as illustrated in FIG. 3. However, it goes without saying that each opening/closing member 5A, 5B, 5C could also be positioned upstream.

In a preferred manner, each opening/closing member 5A, 5B, 5C evolves between only two states: an open state and a closed state. Such a regulating device 3 has a simpler and more reliable structure than a commercially available regulating system which comprises, for example, a proportional solenoid valve, a dome regulator or instead an air assisted valve. Indeed, such systems are not suited to operate in an optimal manner over an extended temperature range as well as over an extended pressure range as required for an aeronautical use. When the regulating device comprises an electric actuation, the regulating device cannot operate if the external temperature is below and too low, which is a drawback. An opening/closing with a plurality of opening/closing members 5A, 5B, 5C evolving between only two states is thus more reliable and less expensive.

The opening/closing members 5A, 5B, 5C may be in various forms, notably a valve, a solenoid valve, a flapper valve or a piston-spring system.

With reference to FIG. 3, the regulating device 3 comprises a member for measuring the pressure 6 in the pipe 22'. In this example, the measuring member 6 is in the form of a sensor comprising a membrane for measuring the pressure P22. Preferably, the pressure measuring member 6 is suited to communicating the measured pressure to a controlling member 7, in particular a calculator, which is connected to the opening/closing members 5A, 5B, 5C. The communication between the pressure measuring member 6,1', the controlling member 7 and the opening/closing members 5A, 5B, 5C may be achieved in a wired or wireless manner. Advantageously, the controlling member 7 is configured to control the opening/closing members 5A, 5B, 5C as a function of the measured pressure P22 in such a way as to ensure a regulation of the pressure in the outlet pipe 22' by modification of the overall passage section of the regulating device 3.

In this exemplary embodiment, the fuel cell P only comprises a pressure regulating device 3 connected to the outlet pipe 22' through which the reaction products linked to dihydrogen R(C2) circulate. However, it goes without saying that each outlet pipe 22, 22' could be associated with a pressure regulating device 3.

In a preferred manner, the second outlet pipe 22' through which the reaction products linked to dihydrogen R(C2) circulate has a smaller passage section than that of the first outlet pipe 22, which facilitates the regulation of pressure. If a single regulating device 3 is used, it is preferable to associate it with the second outlet pipe 22'.

To this end, the pressure measuring member 6 advantageously has a membrane suited to being in contact with traces of dihydrogen.

In this example, the regulating device 3 is removably connected to the outlet pipe 22', which makes it possible to offer new functions to a fuel cell P.

According to a preferred embodiment of the invention, the regulating device 3 is integrated to one end plate 2B of the fuel cell P. Thus, the end plate 2B may advantageously fulfil several functions.

Figure 4:
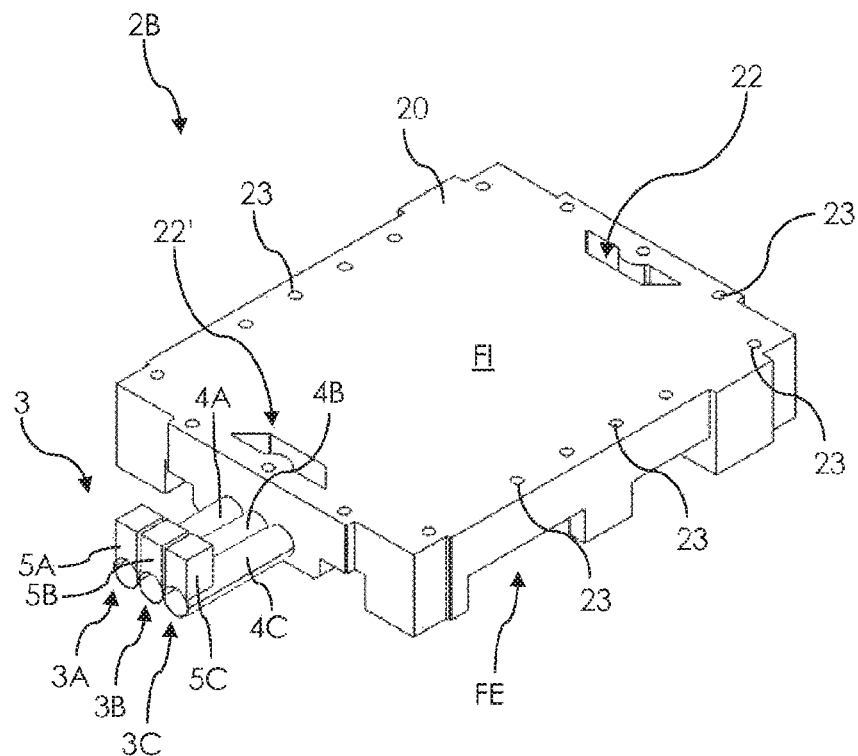
FIG. 4 is a schematic representation in perspective of an end plate of a fuel cell integrating a pressure regulating device.
Figure 5:
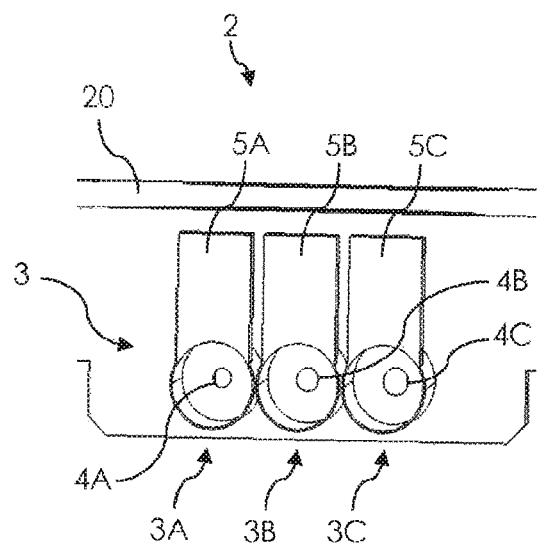
FIG. 5 is a side view of the pressure regulating device of FIG. 4.
Figure 6:
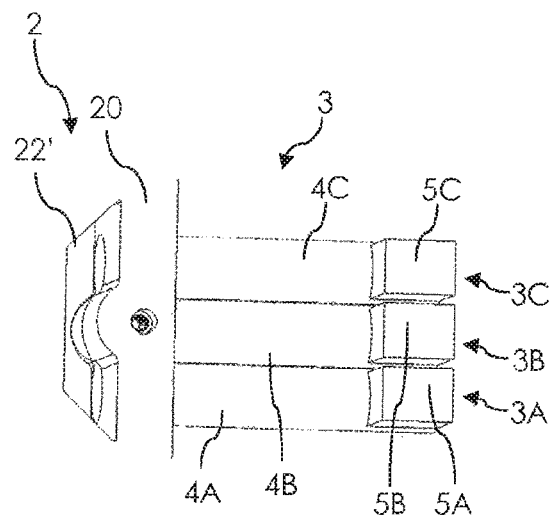
FIG. 6 is a top view of the pressure regulating device of FIG. 4

With reference to FIGS. 4 to 6, the end plate 2B comprises a body 20 in which is formed an outlet pipe 22' for the second fuel C2. The body 20 of the end plate 2B comprises an inner face FI configured to come into contact with the central module 1 and an outer face FE opposite to the inner face FI. In a known manner, the end plate 2B comprises, at the level of its inner face FI, fixation elements 23, here threadings, in order to enable the linking of the end plate 2B to a central module 1, notably, to one of the cells of the central module 1 (cf. FIG. 2).

The pressure regulating device 3 is made integral with the body 20 of the end plate 2B. The branches 3A, 3B, 3C are fluidically connected to the outlet pipe 22' and extend parallel to the plane of the lower face FI of the end plate 2B in order to decrease the overall bulk. The branches 3A, 3B, 3C are parallel and adjacent. Each branch 3A, 3B, 3C has a length preferably comprised between 1 cm and 20 cm. Each branch 3A, 3B, 3C comprises an upstream end connected to the outlet pipe 22' and a free downstream end configured to be connected to an outlet connector 32 (FIG. 3). In other words, the regulating device 3 extends projecting from the body 20 of the end plate 2B.

Each opening/closing member 5A, 5B, 5C is positioned near to the downstream end of the branch 3A, 3B, 3C in such a way as to limit the thermal influence of the body 20 of the end plate 2B on the opening/closing member 5A, 5B, 5C. This is particularly advantageous when the opening/closing member 5A, 5B, 5C comprises a coil element, for example a solenoid valve, the operation of which is influenced by temperature.

An end plate 2B comprising an integrated pressure regulating device 3 is particularly advantageous because it may be used instead of a traditional end plate of a fuel cell P while hardly affecting the bulk.

Figure 7:
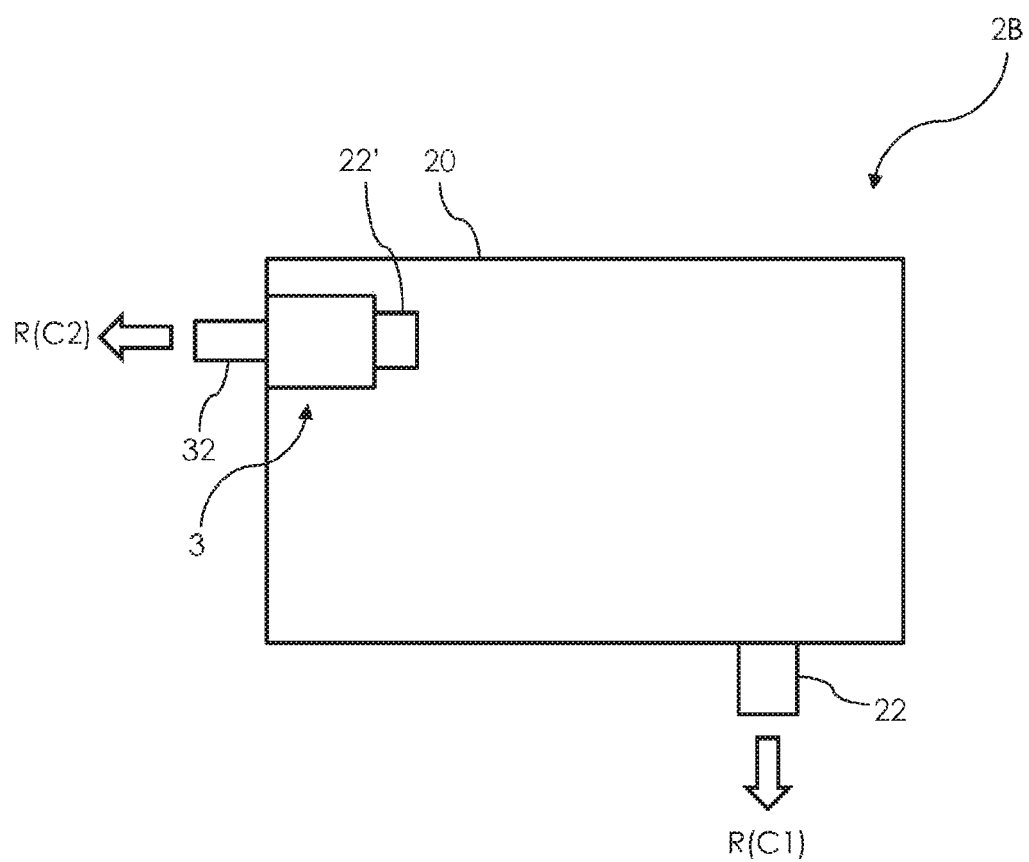
FIG. 7 is a schematic representation of an end plate comprising a regulating device integrated to the body of the plate.

In a preferred manner, with reference to FIG. 7, the pressure regulating device 3 is integrated in the volume of said parallelepiped body 20. Thus, advantage is taken of the volume of the end plate 2B to integrate the regulating device 3. Thus, as illustrated in FIG. 7, only the outlet connector 32 of the regulating device 3A, 3B, 3C extends projecting to enable a connection. The calibrated passage sections 4A, 4B, 4C are produced by additive manufacturing, preferably, during the manufacture of the end plate 2B. Thus, an improved end plate 2B having the same bulk as the prior art is obtained.

An exemplary implementation of a fuel cell P equipped with a pressure regulating device 3 will henceforth be described. As indicated previously, as a function of the opening of each determined passage section 4A, 4B, 4C, the pressure regulating device 3 may define six different overall passage sections to regulate the pressure.

In this example, the pressure in the outlet pipe 22' must be maintained between 1 bar (1000 hPa) and 1.5 bars (1500 hPa) in order to guarantee the mechanical integrity of the fuel cell P. A pressure measuring member 6 is mounted in the outlet pipe 22' and connected to a controlling member 7, here a calculator, which is connected to the opening/closing members 5A, 5B, 5C.

Firstly, as an example, the overall passage section is equal to the second determined passage section 4B. In other words, the opening/closing members 5A, 5C are closed and only the opening/closing member 5B is open.

As an example, if the pressure P22 in the outlet pipe 22' reaches 1.5 bars (1500 hPa) (increasing pressure), the controlling member 7 controls the closing of the opening/closing members 5A, 5B and controls the opening of the third opening/closing member 5C in order that the overall passage section is equal to the third passage section 5C. In other words, the pressure regulating device 3 increases its overall passage section in order to lower the pressure P22 in the outlet pipe 22'.

Conversely, if the pressure P22 in the outlet pipe 22' reaches 1 bar (1000 hPa) (decreasing pressure), the controlling member 7 controls the closing of the opening/closing members 5B, 5C and controls the opening of the first opening/closing member 5A in order that the overall passage section is equal to the first passage section 5A. In other words, the pressure regulating device 3 decreases its overall passage section in order to lower the pressure P22 in the outlet pipe 22'.

Thanks to the invention, the fuel cell P has optimal performances independently of the external pressure. Thus, even if the external pressure decreases greatly, the internal pressure is regulated. This is particularly advantageous for an aeronautical application in the course of which the external pressure can vary in an important manner as a function of the flight altitude of the aircraft.

The invention claimed is:

1. A fuel cell comprising:
 a central module comprising a plurality of cells for generating electricity from at least a first fuel and a second fuel;
 a first end plate connected to a first end of the central module, and a second end plate connected to a second end of the central module;
 at least one of the first and second end plates comprising at least one outlet pipe fluidly connected to the central module and being sized and shaped for discharging of at least one reaction product;
 a pressure regulating device integrated with the first or the second end plate and fluidly connected and configured to measure a pressure in the at least one outlet pipe, said pressure regulating device comprising:
 at least one branch having a passage section, the at least one branch being fluidly connected to the at least one outlet pipe;
 at least one opening/closing member for opening/closing the at least one branch;
 at least one measuring member for measuring pressures in the at least one outlet pipe; and
 at least one controlling member for controlling the at least one opening/closing member as a function of pressures measured by the at least one measuring member.

2. The fuel cell according to claim 1, wherein the pressure regulating device comprises a plurality of branches fluidly connected to the at least one outlet pipe, and wherein each of the plurality of branches having a passage section connected to the at least one opening/closing member and the passage sections of the plurality of branches are controlled by the at least one controlling member as a function of pressures measured at each of the plurality of branches.

3. The fuel cell according to claim 1, wherein the pressure regulating device comprises a plurality of branches fluidly connected to the at least one outlet pipe and each of the plurality of branches has different passage sections.

4. The fuel cell according to claim 1, wherein the pressure regulating device extends from an upstream location to a downstream location of the outlet pipe and the at least one opening/closing member is situated near a downstream end of said pressure regulating device.

5. The fuel cell according to claim 1, wherein the at least one opening/closing member is configured to evolve between an open state and a closed state.

6. The fuel cell according to claim 1, wherein the pressure regulating device is fluidly connected to an outlet pipe wherein dihydrogen reaction products circulate.

7. The fuel cell according to claim 1, wherein at least one of the first and second end plates comprises a parallelepiped body, and the pressure regulating device is at least partially integrated in said parallelepiped body.

8. A method for using a fuel cell, the method comprising:
 measuring a pressure in an outlet pipe of the fuel cell to obtain a measured pressure; and
 opening at least one opening/closing member in a pressure regulating device of the fuel cell to increase an overall passage section of the pressure regulating device if the measured pressure is greater than a determined upper threshold;
 wherein the pressure regulating device comprises:
 at least one branch having a passage section, the at least one branch being fluidly connected to the outlet pipe;
 the at least one opening/closing member for opening/closing the at least one branch:
 at least one measuring member for measuring pressures in the outlet pipe; and
 at least one controlling member for controlling the at least one opening/closing member as a function of pressures measured by the at least one measuring member.

9. The method according to claim 8, the method further comprising:
 closing the at least one opening/closing member to decrease the passage section of the pressure regulating device from a first size to a second size if the measured pressure is below a lower threshold.

* * * * *